USOO9043591B2

(12) United States Patent
Hirata

(10) Patent No.: US 9,043,591 B2
(45) Date of Patent: May 26, 2015

(54) IMAGE FORMING APPARATUS, INFORMATION PROCESSING METHOD, AND STORAGE MEDIUM

(71) Applicant: CANON KABUSHIKI KAISHA, Tokyo (JP)

(72) Inventor: Kensuke Hirata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 14/055,789

(22) Filed: Oct. 16, 2013

(65) Prior Publication Data

US 2014/0123236 A1 May 1, 2014

(30) Foreign Application Priority Data

Oct. 25, 2012 (JP) .................................. 2012-235971

(51) Int. Cl.
G06F 21/00 (2013.01)
H04L 29/06 (2006.01)
(52) U.S. Cl.
CPC .................................. H04L 63/0807 (2013.01)
(58) Field of Classification Search
CPC ................................................... H04L 63/0807
USPC ............................................................. 726/4
See application file for complete search history.

(56) References Cited

U.S. PATENT DOCUMENTS

| 6,865,679 | B1* | 3/2005 | Dennison | 726/21 |
|---|---|---|---|---|
| 2008/0127097 | A1* | 5/2008 | Zhao et al. | 717/124 |
| 2008/0263126 | A1* | 10/2008 | Soman | 709/201 |
| 2011/0047372 | A1* | 2/2011 | Ganesan | 713/155 |
| 2011/0063668 | A1* | 3/2011 | Shirai | 358/1.15 |
| 2011/0109427 | A1* | 5/2011 | Mihira et al. | 340/5.8 |
| 2011/0321176 | A1* | 12/2011 | Matsugashita | 726/28 |
| 2012/0229838 | A1* | 9/2012 | Mogaki | 358/1.14 |
| 2012/0291114 | A1* | 11/2012 | Poliashenko et al. | 726/8 |

FOREIGN PATENT DOCUMENTS

JP 2004-259266 A 9/2004

OTHER PUBLICATIONS

D. Hardt, "The OAuth 2.0 Authorization Framework", Internet Engineering Taskforce (IETF) Oct. 2012, pp. 1-22.

* cited by examiner

Primary Examiner — Morshed Mehedi
(74) Attorney, Agent, or Firm — Canon USA Inc. IP Division

(57) ABSTRACT

An image forming apparatus that communicates with an external apparatus includes receiving local login information regarding a local login to the image forming apparatus, determining, if a request for a URL for authorization without web access authentication is received, whether an internal communication address is used, requesting, if it is determined that the internal communication address is used, authorization request for the external apparatus, and managing an authorization token acquired by requesting the authorization request and the local login information by associating the authorization token with the local login information.

9 Claims, 18 Drawing Sheets

FIG. 2
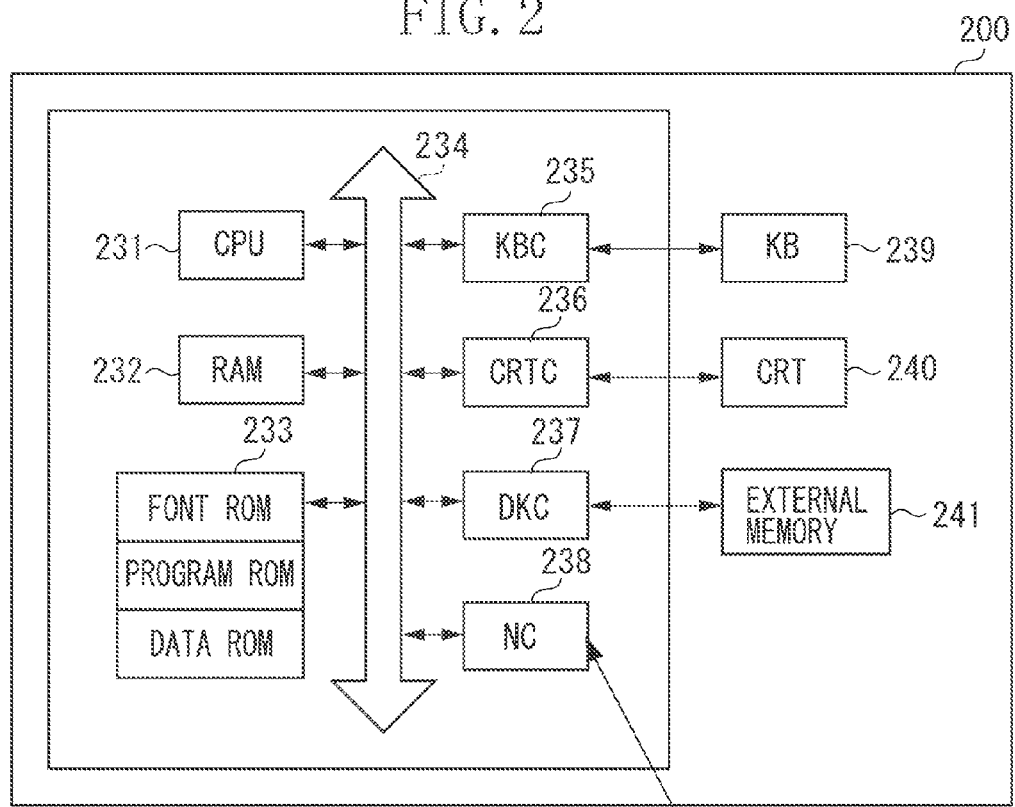
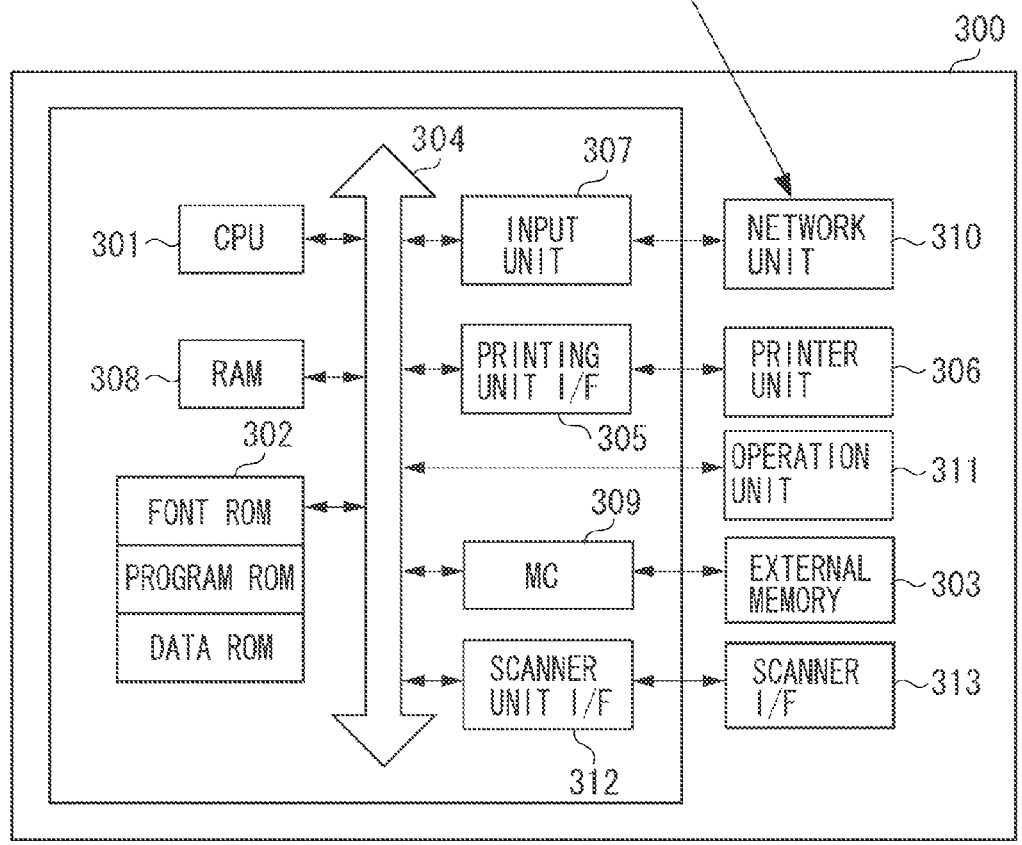

FIG. 4A

| USER MANAGEMENT TABLE 1300 ||| 
|---|---|---|
| USER ID 1301 | PASSWORD 1302 | USER TYPE 1303 |
| uid00000001 | ******** | USER |
| dev00000001 | ************ | CLIENT |
| uid00000002 | ******** | USER |
| | | |

FIG. 4B

CLIENT MANAGEMENT TABLE 1400

| CLIENT ID 1401 | CLIENT NAME 1402 | CLIENT DESCRIPTION 1403 | REDIRECTION URL 1404 | SERIAL NUMBER 1405 |
|---|---|---|---|---|
| dev00000001 | PRINTER MODEL: Printer A | PRINTER NAME: My Printer A INSTALLATION LOCATION: Room 111 | https://dev01/redirect https://127.0.0.1/redirect https://[::1]/redirect https://192.168.0.1/redirect https://[fe80::2e0:a4ff:fe21:d800]/redirect https://127.0.0.1/redirect/device https://[::1]/redirect/device | #0000001 |

FIG. 4C

AUTHORIZATION TOKEN MANAGEMENT TABLE 1500

| AUTHORIZATION TOKEN ID 1501 | TOKEN TYPE 1502 | EXPIRATION DATE 1503 | SCOPE 1504 | REFRESH TOKEN ID 1505 | REFRESH EXPIRATION DATE 1506 | CLIENT ID 1507 | USER ID 1508 |
|---|---|---|---|---|---|---|---|
| AT_000000 | AUTHORIZATION CODE | 2013/09/30 11:00:00 | RESOURCE A | | | dev00000001 | uid00000001 |
| AT_000001 | PARENT TOKEN | 2013/09/30 12:00:00 | RESOURCE A | RT_000001 | 2014/09/30 12:00:00 | dev00000001 | uid00000001 |
| AT_000002 | CHILD TOKEN | 2013/09/30 13:00:00 | RESOURCE A | | | dev00000001 | uid00000001 |
| AT_000003 | PARENT TOKEN | 2013/09/30 16:00:00 | RESOURCE A | RT_000002 | 2014/09/30 16:00:00 | dev00000001 | uid00000002 |

FIG. 5A

15000
DEVICE USER MANAGEMENT TABLE

| USER ID | PASSWORD | IC CARD INFORMATION |
|---------|----------|---------------------|
| user001 | ******** | ****** |
| user002 | ******** | ****** |
|         |          |        |

DEVICE MANAGEMENT TABLE 1600

| 1601 | 1602 | 1603 | 1605 | 1606 | 1607 |
|---|---|---|---|---|---|
| CLIENT ID | CLIENT SECRET | END POINT URL | CLIENT NAME | CLIENT DESCRIPTION | REDIRECTION URL |
| dev00000001 | ************ | https://authz/oauth | PRINTER MODEL: Printer A | PRINTER NAME: My Printer A<br>INSTALLATION LOCATION: Room 111 | https://dev01/redirect<br>https://127.0.0.1/redirect<br>https://[::1]/redirect<br>https://192.168.0.1/redirect<br>Https://[fe80::2e0:a4ff:fe21:d800]/redirect<br>https://127.0.0.1/redirect/device<br>https://[::1]/redirect/device |

FIG. 5C

PARENT TOKEN MANAGEMENT TABLE 1700

| USER ID 1701 | AUTHORIZATION TOKEN ID 1702 | REFRESH TOKEN ID 1703 |
|---|---|---|
| user001 | AT_000001 | RT_000001 |
| user002 | AT_000003 | RT_000002 |

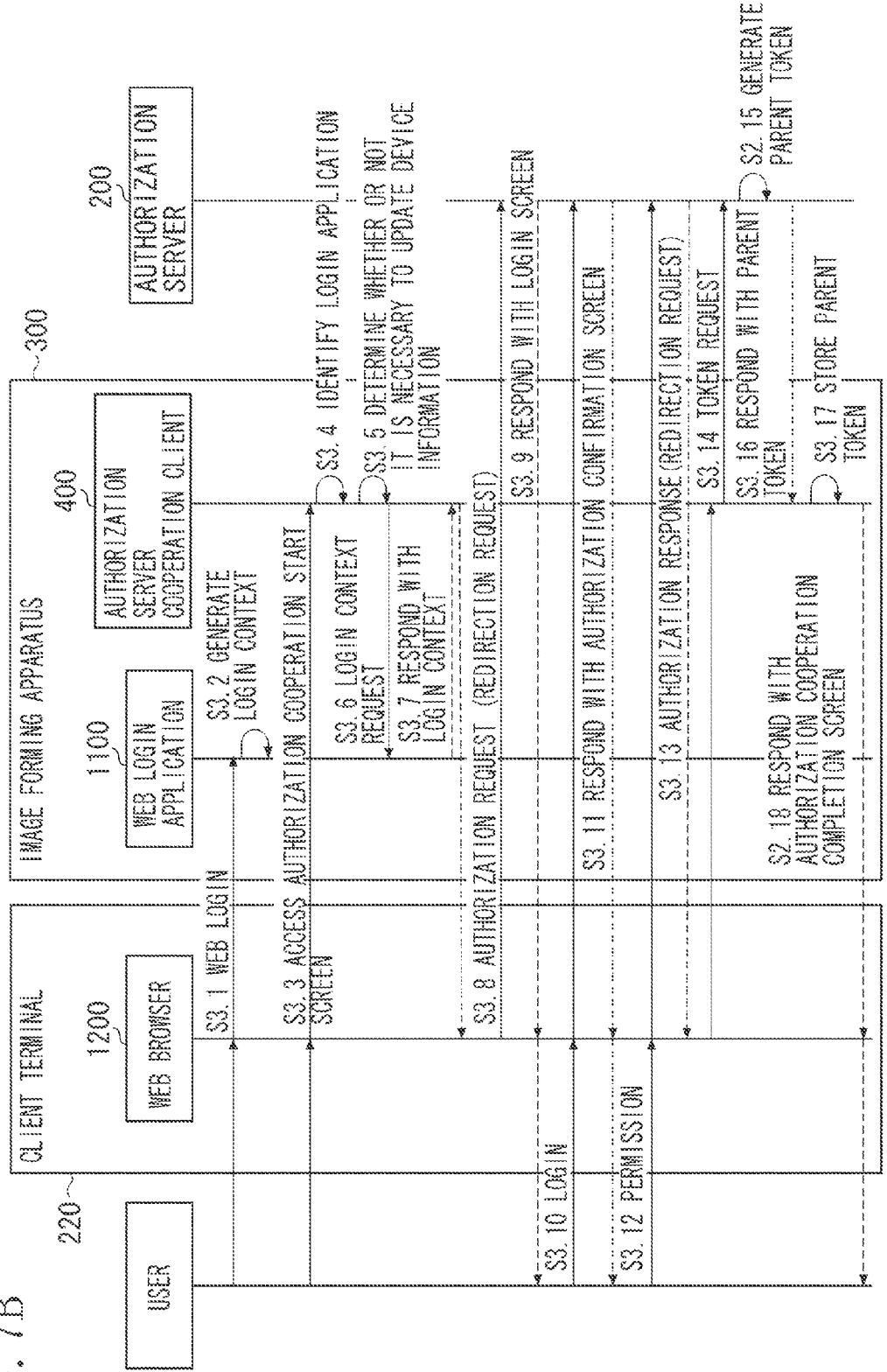

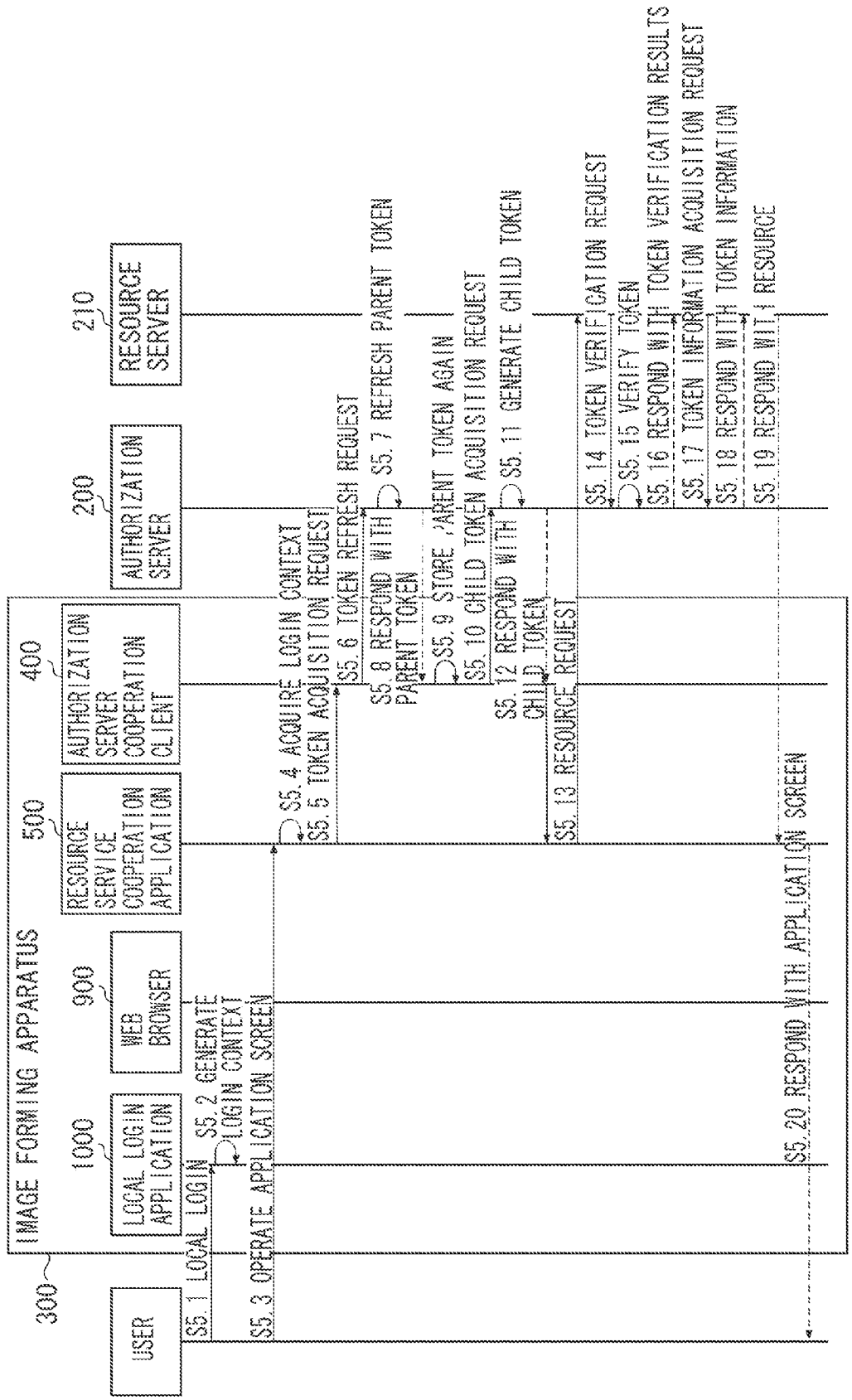

IMAGE FORMING APPARATUS, INFORMATION PROCESSING METHOD, AND STORAGE MEDIUM

BACKGROUND

1. Field

Aspects of the present invention generally relate to an image forming apparatus, an information processing method, and a storage medium.

2. Description of the Related Art

In recent years, services have been provided that create an electronic document in Portable Document Format (PDF) on the Internet, or accumulate electronic documents on the Internet. Using such services, a user can create a PDF file even if a terminal owned by the user does not have a PDF creation function, and the user can also store electronic documents that exceed the storage capacity of the terminal. A service provider can provide the user with an added value by causing these services to cooperate with each other. For example, the user can store a created electronic document in PDF directly on the Internet, not via the terminal owned by the user. Cooperation of the services can cause some issues.

More specifically, the exchange of more information than desired by the user between the services poses a risk of leakage of user data and personal information. For example, a plurality of services exists on the Internet, and service cooperation is achieved between various services. It is, however, undesirable that a service other than a service that provides the user with a desired result should acquire user data and personal information. At the same time, it is desirable for a service provider that the mechanism of service cooperation should be easily implemented.

In these circumstances, a standard protocol termed OAuth is formulated to achieve authorization cooperation. OAuth is described in detail below. Based on OAuth, for example, data of a user managed by a service A can be accessed by an external service B approved by the user. In this case, after the range of access of the external service B is defined, the access of the external service B to the service A is explicitly authorized by the user. The explicit authorization of the user is referred to as an "authorization operation".

When the user has performed an authorization operation, the external service B receives from the service A a token that proves the authorization for access (hereinafter referred to as an "authorization token"), and the external service B can access the service A using the authorization token after that.

The use of the authorization token enables the external service B to access the service A by the authority of the user having given the authorization and without authentication information of the user. Thus, the external service B having acquired the authorization token has a responsibility to strictly and properly manage the authorization token. Further, Japanese Patent Application Laid-Open No. 2004-259266 states that an image processing apparatus includes two interfaces to receive a password via an operation panel of the image processing apparatus or a network.

Further, some recent devices provide a user with an added value by cooperating with a cloud service using OAuth.

For example, there are services termed social networking services (hereinafter referred to as "SNSs"). These services can be used through a smartphone. Although there are various SNSs, the installation of a particular application onto the smartphone and the use of the application may facilitate the use of the SNSs. For example, if a user wishes to periodically post their location to an SNS, the user may use a positioning function of a smartphone and use an application that periodically measures a position and posts information to an SNS. This will feel convenient to the user. The application installed on the smartphone accesses the SNS on behalf of the user. OAuth may be used in such a case. The user can use the SNS via the application by permitting the application to perform a minimum function required for using the SNS, for example, posting an article.

Now, a case is considered where an image forming apparatus serves as an OAuth client and cooperates with a cloud service. A user transfers to the image forming apparatus the authority to access a resource in the cloud service, thereby allowing the image forming apparatus to cooperate with the cloud service. It often happens, however, that the image processing apparatus is shared between a plurality of users and therefore a plurality of users is managed. It is, however, undesirable that all the users of the image processing apparatus are able to access the resource in the cloud service while the authority of the user is transferred to the image forming apparatus. Thus, the user of the cloud service and the user of the image forming apparatus need to cooperate with each other.

As one solution for the cooperation of the user of the cloud service, with the user of the image forming apparatus, an authorization token is held being linked with the user of the image forming apparatus, and the cloud service is accessed using the authorization token linked with the user having logged into the image forming apparatus. Thus, it is possible to achieve a single sign-on (SSO) for the cloud service and the image forming apparatus. To link the authorization token with the user of the image forming apparatus, the user needs to transfer authority by using a web browser when the user is logging into the image forming apparatus.

Methods of logging into the image forming apparatus include logging in through an operation unit of the image forming apparatus and logging into a web site using a web browser. To use a web browser in the image forming apparatus, however, it is necessary to log into the image forming apparatus through the operation unit and also log into a web site in response to a request from the web browser. This forces the user to log into the image forming apparatus twice, which reduces convenience.

Japanese Patent Application Laid-Open No. 2004-259266 discusses a technique in which an image processing apparatus can receive a password via an operation panel or a network. Japanese Patent Application Laid-Open No. 2004-259266, however, does not consider the above problem.

SUMMARY

Aspects of the present invention are generally directed to enabling an easy login and also enabling the prevention of unauthorized access.

Aspects of the present invention include an image forming apparatus that includes a memory and a processor, wherein the processor is configured to receive local login information regarding a local login to the image forming apparatus, determine, if a request for a URL for authorization without web access authentication is received, whether an internal communication address is used, request, if it is determined that the internal communication address is used, authorization request for the external apparatus, and manage an authorization token that is acquired by requesting the authorization request and the local login information by associating the authorization token with the local login information.

Further features and aspects of the present disclosure will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram illustrating examples of the hardware configurations of an authorization server and an image forming apparatus.

FIG. 4A is a diagram illustrating an example of a user management table.

FIG. 4B is a diagram illustrating an example of a client management table.

FIG. 4C is a diagram illustrating an example of an authorization token management table.

FIG. 5A is a diagram illustrating an example of a device user management table.

FIG. 5B is a diagram illustrating an example of a device management table.

FIG. 5C is a diagram illustrating an example of a parent token management table.

FIG. 7B is a diagram illustrating an example of the sequence of acquiring a parent token.

FIG. 10 is a diagram illustrating an example of a sequence regarding the acquisition of a child token.

DESCRIPTION OF THE EMBODIMENTS

Figure 1:
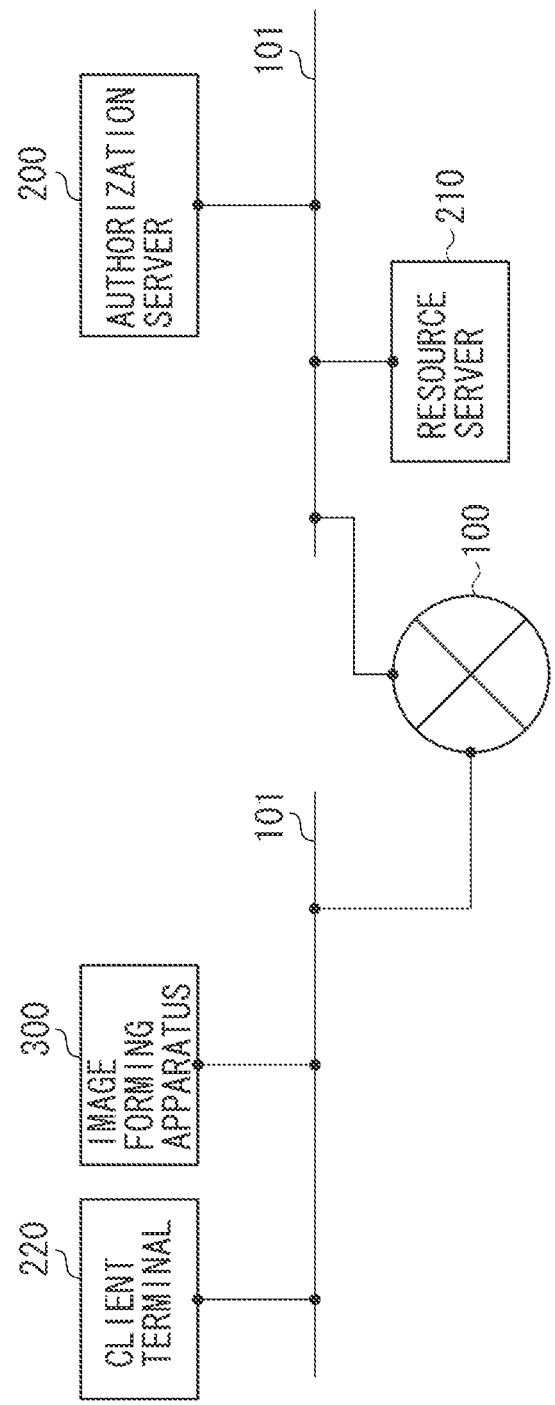
FIG. 1 is a diagram illustrating an example of the system configuration of an authority transfer system.

Various exemplary embodiments will be described in detail below with reference to the drawings.

In the present exemplary embodiment, it is assumed that a form service, which generates form data on the Internet, and a print service, which acquires data on the Internet to print the data, are installed on a server on the Internet.

A service that provides a function on the Internet, such as the form service or the print service is hereinafter referred to as a "resource service".

Further, in the present exemplary embodiment, it is assumed that a print application and a form application installed on an image forming apparatus use the resource services. An application that uses a resource service such as the print application or the form application is hereinafter referred to as a "resource service cooperation application". A resource service is not limited to the form service or the print service. An application is not limited to the form application or the print application.

Further, in the present exemplary embodiment, authority is transferred by using the workings of OAuth. OAuth uses information termed a token, as information for proving authority transferred from a user.

Particularly, a token used when the user has transferred authority to the image forming apparatus is referred to as a "parent token". In the present exemplary embodiment, the authority of the user is transferred to a device such as an image forming apparatus. For example, the case is considered where the print application and the form application are present in the image forming apparatus.

In this case, to use a resource service through the print application, the user individually authorizes the print application, thereby transferring the authority of the user to the print application. To use a resource service through the form application, the user individually authorizes the form application, thereby transferring the authority of the user to the form application. From a standpoint of the user, to use the resource services through the same image forming apparatus, it is more convenient if, for example, the user can use the resource services through the respective applications by performing a single authorization operation.

In response, when the authority is transferred to each application, the image forming apparatus transfers the authority to the application instead of the user, thereby reducing the number of times the user performs an authorization operation. That is, when the user transfers the authority to the image forming apparatus, the user has permitted the transfer of the authority also to the application.

If, however, a parent token acquired by the image forming apparatus is allowed to be shared among the applications in the image forming apparatus as a method of finishing an authorization operation at a time, all the applications that share the parent token can access all the resource services, which is undesirable. This is because, if any one of the applications accesses any one of the resource services using the shared parent token, the resource service cannot identify the application having accessed the resource service, and therefore cannot determine whether the resource service can be used. Accordingly, each resource service cooperation application does not directly use the parent token, but uses a token issued by, while taking over information transferred to the parent token, transferring the information again to each application. The token issued by transferring the information of the parent token again to each application is referred to as a "child token".

FIG. 1 is a diagram illustrating an example of the system configuration of an authority transfer system. In the present exemplary embodiment, a wide area network (WAN) 100 is constructed using the World Wide Web (WWW) system. Local area networks (LANs) 101 connect components to one another.

An authorization server 200 is a server for achieving OAuth.

On the authorization server 200, an authorization service module is installed. On a resource server 210, resource services such as a print service and a form service are installed. On one resource server, one or more resource services may be installed. On a client terminal 220, a web browser is installed.

On an image forming apparatus 300, one or more resource service cooperation applications are installed. The user utilizes the resource services using the resource service cooperation applications.

Further, the authorization server 200, the resource server 210, the client terminal 220, and the image forming apparatus 300 are connected to one another via the WAN 100 and the LANs 101. The authorization server 200, the resource server 210, the client terminal 220, and the image forming apparatus 300 may each be configured on an individual LAN, or may be configured on the same LAN. Further, both the function of the authorization server 200 and the function of the resource server 210 may be included in one server.

FIG. 2 is a diagram illustrating examples of the hardware configurations of the image forming apparatus 300 and the authorization server 200.

First, the configuration of the authorization server 200 is described. The hardware configuration of the authorization server 200 illustrated in FIG. 2 corresponds to the hardware configuration of a general information processing apparatus. The hardware configuration of a general information processing apparatus can be applied to the authorization server 200 according to the present exemplary embodiment. The same goes for the resource server 210 and the client terminal 220.

Referring to FIG. 2, a central processing unit (CPU) 231 executes programs for an operating system (OS) and an application, which are stored in a program ROM of a read-only memory (ROM) 233 or have been loaded from an external memory 241 such as a hard disk (HD) into a random access memory (RAM) 232. Thus, each block connected to a system bus 234 is controlled. The "OS" is an abbreviation for an operating system that operates on a computer, and the operating system is hereinafter referred to as an "OS". The processing of sequences and the software configurations, described later, are achieved by the CPU 231 executing programs.

The RAM 232 functions as a main memory and a work area of the CPU 231. A keyboard controller (KBC) 235 controls a key input from a keyboard 239 or a pointing device (not illustrated).

A cathode ray tube controller (CRTC) 236 controls the display of a CRT display 240.

A disk controller (DKC) 237 controls access to data in the external memory 241 such as a hard disk (HD), which stores various types of data.

A network controller (NC) 238 controls communication with the image forming apparatus 300 or another device connected to the authorization server 200 via the WAN 100 or the LANs 101.

As described above, an application (module) is implemented by the CPU 231 executing a program; however, for ease of description, an application may occasionally be described such that the application performs processing.

Next, the configuration of the image forming apparatus 300 is described. As illustrated in FIG. 2, in the image forming apparatus 300, a CPU 301 controls all blocks connected to a system bus 304 based on a control program stored in a ROM 302 or an external memory 303. An image signal generated in the processing performed by the CPU 301 is output as output information to a printing unit (image forming apparatus engine) 306 via a printing unit interface (I/F) 305. Further, the CPU 301 can communicate with the authorization server 200 via an input unit 307 and a network unit 310, and can notify the authorization server 200 of the information in the image forming apparatus 300.

A program ROM in the ROM 302 stores a control program for the CPU 301. A font ROM in the ROM 302 stores font data that is used to generate output information. A data ROM in the ROM 302 stores information that is transmitted and received to and from the authorization server 200 if the image forming apparatus 300 does not have the external memory 303 such as a hard disk.

A RAM 308 functions as a main memory and a work area of the CPU 301 and is configured to expand its memory capacity using an optional RAM, which is connected to an additional port (not illustrated). The RAM 308 is also used as an output information expansion region, an environment data storage region, and a nonvolatile random access memory (NVRAM).

A memory controller (MC) 309 controls access to the external memory 303. The external memory 303 is connected as an option and stores font data, an emulation program, and form data. Further, an operation unit 311 includes operation switches and a light-emitting diode (LED) display.

The flow charts described later and the module configuration of the image forming apparatus 300 are implemented by the CPU 301 executing processing based on programs stored in the ROM 302 or the external memory 303. An application is implemented by the CPU 301 executing a program; however, for ease of description, an application may occasionally be described such that the application performs processing.

Figure 3:
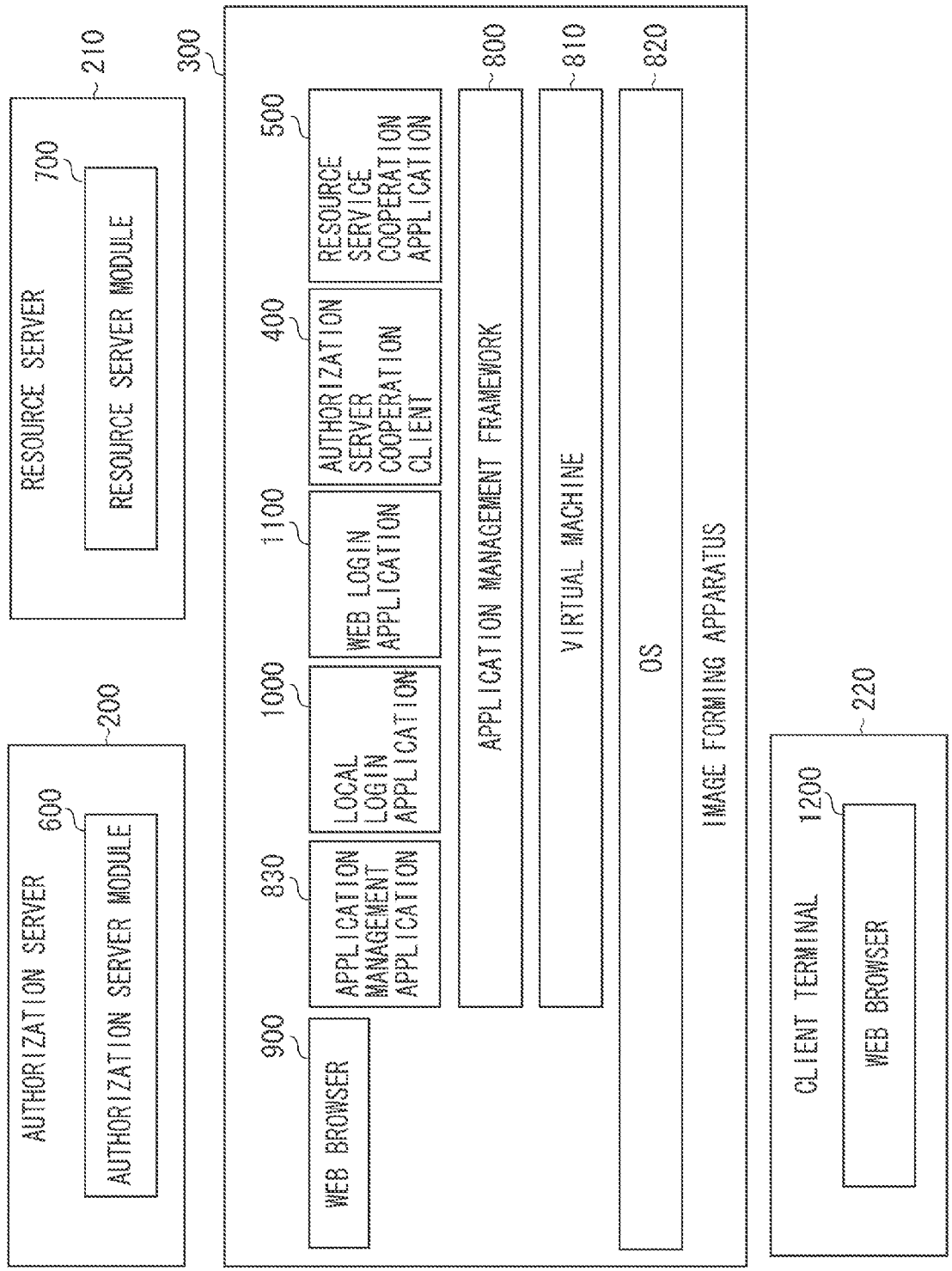
FIG. 3 is a diagram illustrating examples of the module configurations of the authorization server, a resource server, a client terminal, and the image forming apparatus.

FIG. 3 is a diagram illustrating examples of the module configurations of the authorization server 200, the resource server 210, the client terminal 220, and the image forming apparatus 300.

The authorization server 200, the resource server 210, the client terminal 220, and the image forming apparatus 300 are the same as those of FIG. 1.

The authorization server 200 includes an authorization server module 600.

The resource server 210 includes a resource server module 700.

The client terminal 220 includes a web browser 1200, which is a user agent for using the WWW.

As an OS 820, a real-time OS is generally used, but these days, a general-purpose OS such as Linux® may occasionally be used.

As a virtual machine 810, for example, Java® VM is well known. The virtual machine 810 is a virtual application execution environment that operates as an application to be controlled by an OS.

An application management framework 800 has the function of managing the life cycle of a management target application that operates in the application execution environment provided by the virtual machine 810. Further, the application management framework 800 has the function of releasing an interface for controlling the above function of managing the life cycle of the management target application, and also releasing an interface for mediating a processing request between applications. The life cycle represents the state of the application, including the installation, the starting, the stopping, and the uninstallation of the application. The application management framework 800 according to the present exemplary embodiment is described as an OSGi (registered trademark) framework defined by the Open Services Gateway initiative (OSGi) Alliance.

Further, an authorization server cooperation client 400 and one or more resource service cooperation applications 500 are various applications that operate in the application execution environment provided by the virtual machine 810. Similarly, also a local login application 1000 and a web login application 1100 are various applications that operate in the application execution environment provided by the virtual machine 810. The life cycles of these applications are managed by the application management framework 800.

An application management application 830 receives a request to install various applications and a request to start the various applications from the user via the life cycle management control I/F released by the application management framework 800, and then installs or starts the various applications.

The authorization server cooperation client 400, the resource service cooperation applications 500, the local login application 1000, and the web login application 1100 may be installed in advance when the image forming apparatus 300 is shipped, or may be installed later by the image forming apparatus 300 via the application management application 830 and the application management framework 800.

The image forming apparatus 300 further includes a web browser 900, which is a user agent for using the WWW.

FIGS. 4A, 4B, and 4C are diagrams illustrating examples of data tables stored in the external memory 241 by the authorization server 200. These data tables may be stored not in the external memory 241 of the authorization server 200 but in another server configured to communicate with the authorization server 200 via the LAN 101.

FIG. 4A is a diagram illustrating an example of a user management table 1300. The user management table 1300 includes a user identification (ID) 1301, a password 1302, and a user type 1303. The authorization server 200 has the function of verifying the set of pieces of information of the user ID 1301 and the password 1302, and if the verification has been successful, generating authentication information (for example, an authentication session ID), thereby authenticating each user or each client.

FIG. 4B is a diagram illustrating an example of a client management table 1400. The client management table 1400 includes a client ID 1401, a client name 1402, a client description 1403, a redirection uniform resource locator (URL) 1404, and a serial number 1405. The client ID 1401 is associated with the user ID 1301 of the user management table 1300 so that the client ID 1401 and the user ID 1301 can refer to each other. The client name 1402, the client description 1403, and the redirection URL 1404 are values to be used in the sequence of OAuth described later. The serial number 1405 is a value to be registered when the client is the image forming apparatus 300. The serial number 1405 is a value that enables uniquely identifying the image forming apparatus 300.

FIG. 4C is a diagram illustrating an example of an authorization token management table 1500. The authorization token management table 1500 includes an authorization token ID 1501, a token type 1502, an expiration date 1503, a scope 1504, a refresh token ID 1505, a refresh expiration date 1506, a client ID 1507, and a user ID 1508. The authorization token management table 1500 will be described in detail later.

FIGS. 5A, 5B, and 5C are diagrams illustrating examples of data tables stored in the external memory 303 by the image forming apparatus 300.

FIG. 5A is a diagram illustrating an example of a device user management table 15000. The device user management table 15000 can be referred to and updated through the local login application 1000 and the web login application 1100. In the present exemplary embodiment, these data tables are described such that they are stored in the external memory 303 of the image forming apparatus 300, but may be stored in another server configured to communicate with the image forming apparatus 300 via the LAN 101.

The device user management table 15000 includes a user ID 15010, a password 15020, and integrated circuit (IC) card information 15030.

The local login application 1000 forms a screen for receiving a user ID and a password from a user, using an input screen of the image forming apparatus 300. The local login application 1000 verifies whether the set of the user ID and the password that have been received matches the set of the user ID 15010 and the password 15020. If the verification has been positive, the local login application 1000 generates a login context including information of the user ID 15010. This provides the local login application 1000 with the function of authenticating each user. In addition, the local login application 1000 may acquire IC card information from an IC card reader connected to the image forming apparatus 300, and verify whether the acquired IC card information matches information of the IC card information 15030. Then, if the verification has been positive, the local login application 1000 may generate a login context including information of the corresponding user ID 15010, thereby authenticating each user.

The web login application 1100 forms a screen for receiving a user ID and a password of a user from a web browser. Then, the web login application 1100 verifies whether the set of the user ID and the password that have been received matches the set of the user ID 15010 and the password 15020. If the verification has been positive, the web login application 1100 generates a login context including information of the user ID 15010. This provides the web login application 1100 with the function of authenticating each user. The "login context" refers to an object in which information of the user ID 15010 of an authenticated user has been set. The login context can also be configured such that attribute information of the user, such as information of a domain to which the user belongs and an electronic mail address of the user, is set. The success of a login to the web login application 1100 allows the use of the authorization server cooperation client 400 and the resource service cooperation applications 500 through the web browser 900 or 1200.

FIG. 5B is a diagram illustrating an example of a device management table 1600. The device management table 1600 can be referred to and updated only through the authorization server cooperation client 400. The device management table 1600 includes a client ID 1601, a client secret 1602, an end point URL 1603, a client name 1605, a client description 1606, and a redirection URL 1607. The client ID 1601 and the client secret 1602 correspond to the user ID 1301 and the password 1302, respectively, which have been issued by and stored in the authorization server 200 in advance. Also in the client name 1605, the client description 1606, and the redirection URL 1607, data is stored that is similar to information registered in the client management table 1400 of the authorization server 200 together with the client ID 1401 and the serial number 1405 of the image forming apparatus 300.

The timing at which the authorization server cooperation client 400 registers these pieces of client information in the authorization server 200 and updates these pieces of client information is, for example, the start of the authorization server cooperation client 400 and the start of authorization cooperation. The registration and the update of the client information will be described in detail later. The end point URL 1603 is the URL of an end point for OAuth, which is released by the authorization server 200.

FIG. 5C is a diagram illustrating an example of a parent token management table 1700. The parent token management table 1700 can be referred to and updated only through the authorization server cooperation client 400. The parent token management table 1700 includes a user ID 1701, an authorization token ID 1702, and a refresh token ID 1703. The parent token management table 1700 will be described in detail later.

The authorization server cooperation client 400 registers the client information in the authorization server 200 and updates the client information at the start of an application.

Figure 6:
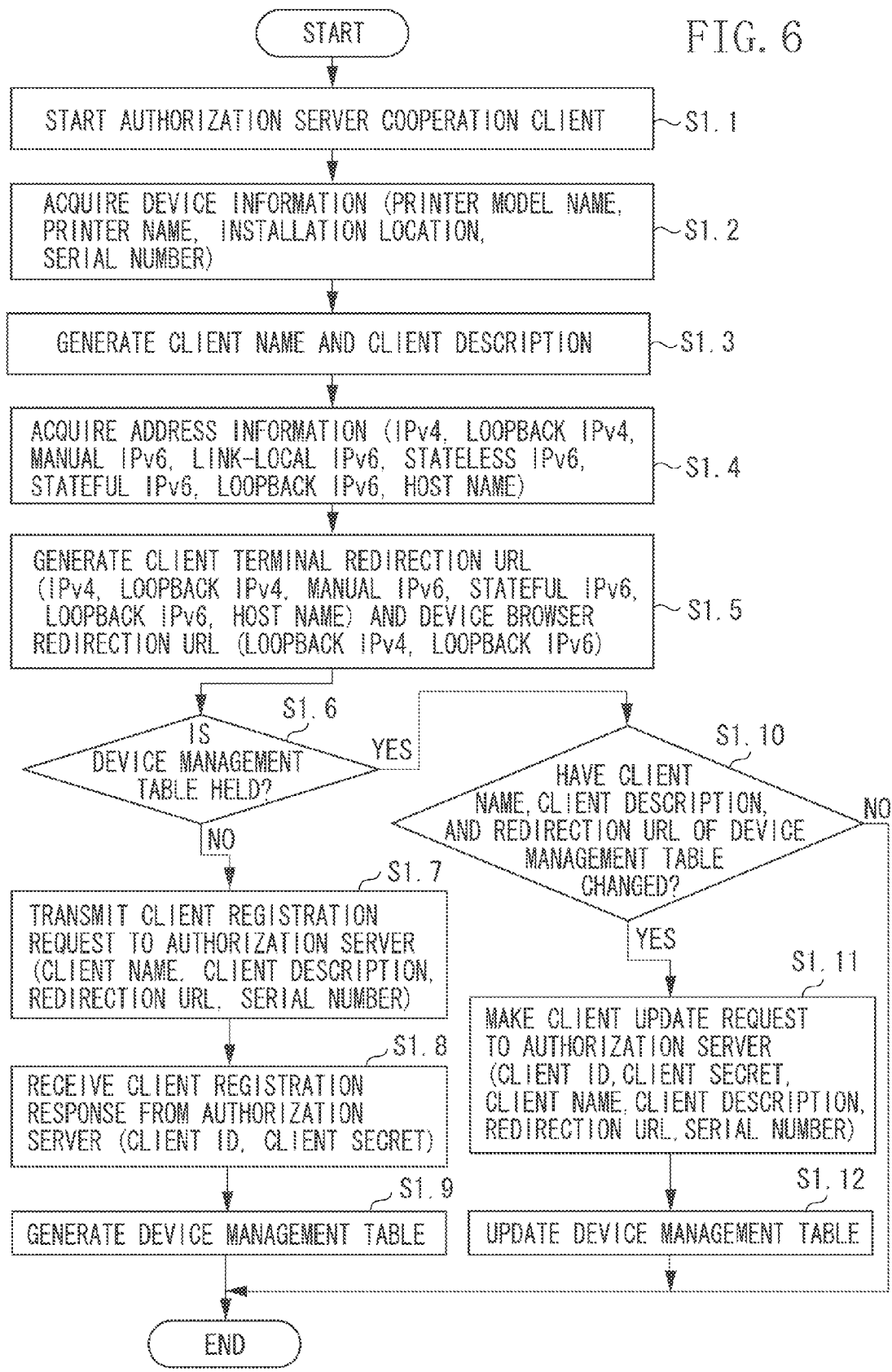
FIG. 6 is a flow chart illustrating an example of the process of registering and updating client information.

FIG. 6 is a flow chart illustrating an example of the process of registering and updating the client information at the start of the authorization server cooperation client 400.

In step S1.1, the application management framework 800 starts the authorization server cooperation client 400. First, in step S1.2, the authorization server cooperation client 400 acquires the device information of the image forming apparatus 300. The device information to be acquired in step S1.2 includes the printer model name, the printer name, the installation location, and the serial number.

Next, in step S1.3, the authorization server cooperation client 400 generates a client name and a client description using the device information acquired in step S1.2. The client name and the client description to be generated by the authorization server cooperation client 400 are character strings as illustrated in the examples of FIG. 5B. In the present exemplary embodiment, the printer model name is used as the client name, and the printer name and the installation location are used as the client description. The client name and the client description are displayed on an authorization confirmation screen 1803, and therefore, it is desirable that the client name and the client description should be character strings identifiable by the user. The user can change the printer name and the installation location to any values. If the printer name and the installation location have been changed, also the client name and the client description are changed accordingly.

Next, in step S1.4, the authorization server cooperation client 400 acquires address information of the image forming apparatus 300. The address information of the image forming apparatus 300 includes an Internet Protocol version 4 (IPv4) address, a loopback IPv4 address, a manual Internet Protocol version 6 (IPv6) address, a link-local IPv6 address, and a stateless IPv6 address. The address information of the image forming apparatus 300 further includes a stateful IPv6 address, a loopback IPv6 address, and a host name. There is a possibility that the IPv4 address, the manual IPv6 address, the link-local IPv6 address, the stateless IPv6 address, the stateful IPv6 address, and the host name are changed depending on the network environment.

Next, in step S1.5, the authorization server cooperation client 400 generates a client terminal redirection URL and a device browser redirection URL based on the address information acquired in step S1.4. The client terminal redirection URL is a URL to which the web browser 1200 of the client terminal 220 can connect. The authorization server cooperation client 400 generates the client terminal redirection URL as the fully qualified domain names (FQDNs) of the IPv4 address, the manual IPv6 address, the stateful IPv6 address, and the host name. Further, the authorization server cooperation client 400 generates the device browser redirection URL as the FQDNs of the loopback IPv4 address and the loopback IPv6 address. As an example, the redirection URL 1607 in FIG. 5B includes the client terminal redirection URL and the device browser redirection URL.

The device browser redirection URL is an example of a first URL for authorization without web access authentication. The client terminal redirection URL is an example of a second URL for authorization with web access authentication.

In the present exemplary embodiment, Hypertext Transfer Protocol Secure (HTTPS) is used as a transfer protocol, where the end point of the client terminal redirection URL is "redirect", and the end point of the device browser redirection URL is "redirect/device".

Next, in step S1.6, the authorization server cooperation client 400 confirms whether the authorization server cooperation client 400 already holds the device management table 1600. If the authorization server cooperation client 400 already holds the device management table 1600, the processing proceeds to step S1.10. If the authorization server cooperation client 400 does not hold the device management table 1600, the processing proceeds to step S1.7. In step S1.7, the authorization server cooperation client 400 transmits to the authorization server 200 a client registration request including the client name, the client description, and the redirection URLs generated in steps S1.3 and S1.5 and the serial number acquired in step S1.2.

Subsequently, in step S1.8, the authorization server cooperation client 400 receives a client ID and a client secret as a client registration response from the authorization server 200. In step S1.9, the authorization server cooperation client 400 generates and holds the device management table 1600. At this time, the authorization server cooperation client 400 holds in the device management table 1600 the client name, the client description, and the redirection URLs generated in steps S1.3 and S1.5, and holds the end point of the authorization server 200 as the end point URL.

On the other hand, in step S1.10, the authorization server cooperation client 400 compares the client name 1605, the client description 1606, and the redirection URL 1607 held in the device management table 1600, with the client name, the client description, and the redirection URLs generated in steps S1.3 and S1.5, thereby determining whether the client name 1605, the client description 1606, and the redirection URL 1607 have changed. The client name, printer name and the installation location to be used as the client name and the client description can be changed. Further, also the IPv4 address, the manual IPv6 address, the link-local IPv6 address, the stateless IPv6 address, the stateful IPv6 address, and the host name to be used as the client terminal redirection URL can be changed. If the client name 1605, the client description 1606, and the redirection URL 1607 have changed, the authorization server cooperation client 400 makes a client update request to the authorization server 200.

The client update request includes the client ID 1601 and the client secret 1602 of the device management table 1600. The client update request also includes the client name, the client description, and the redirection URLs generated in steps S1.3 and S1.5 and the serial number acquired in step S1.2. If the client update request has been successful, in step S1.12, the authorization server cooperation client 400 updates the device management table 1600 using the information notified in the client update request.

Figure 7A:
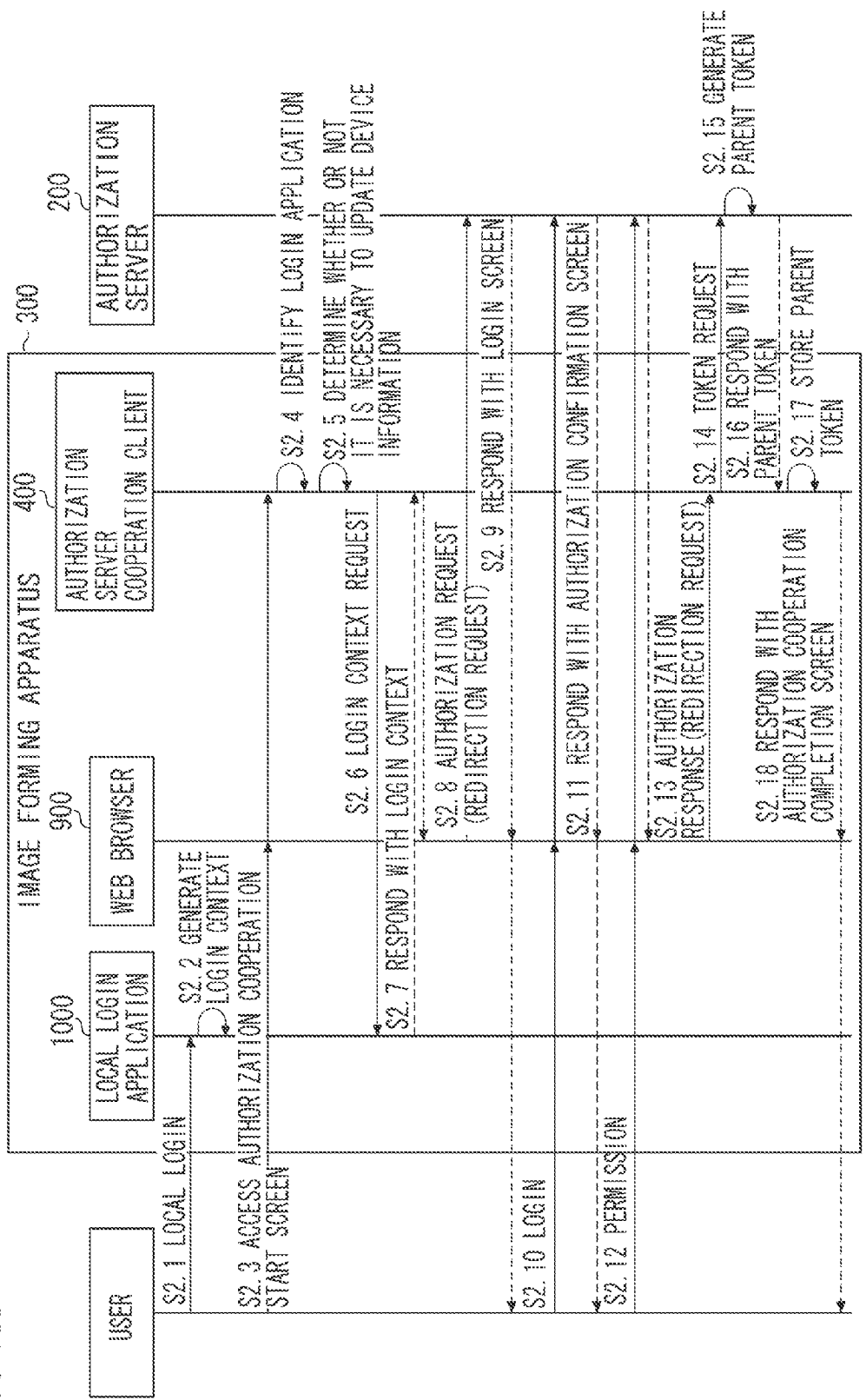
FIG. 7A is a diagram illustrating an example of the sequence of acquiring a parent token.

Next, sequences according to the present exemplary embodiment regarding the acquisition of a parent token are described. FIG. 7A is the sequence of acquiring a parent token using the web browser 900 of the image forming apparatus 300. FIG. 7B is the sequence of acquiring a parent token using the web browser 1200 of the client terminal 220. These sequences are processes based on an operation performed only once using the web browser 900 of the image forming apparatus 300 or the web browser 1200 of the client terminal 220 when the user first uses the image forming apparatus 300. First, with reference to FIG. 7A, the sequence of acquiring a parent token using the web browser 900 of the image forming apparatus 300 is described. First, in step S2.1, the user logs into the image forming apparatus 300 by a login method using an input screen of the image forming apparatus 300 provided by the local login application 1000. If the user having logged in has the user ID "user 001", in step S2.2, the local login application 1000 generates a login context including "user 001".

Figure 8A:
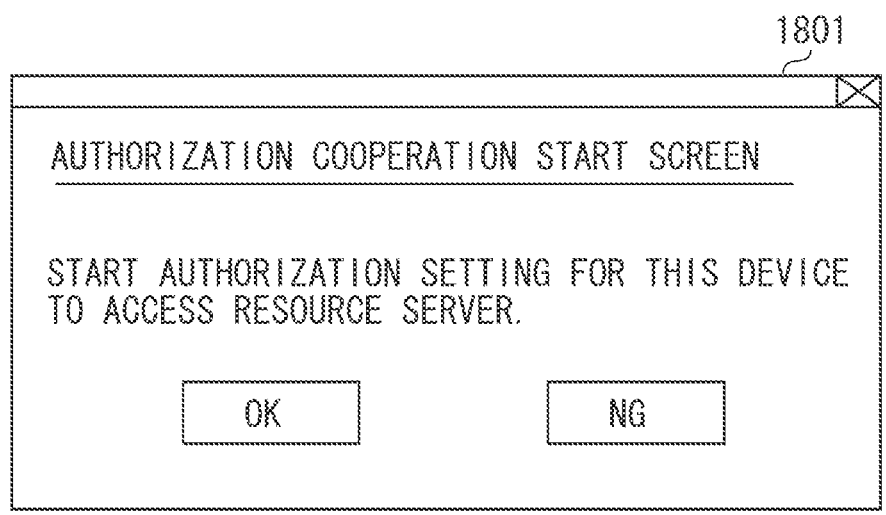
FIG. 8A is a diagram illustrating an example of a screen for confirming the start of authorization cooperation.

Next, in step S2.3, the web browser 900 accesses a device browser authorization URL to start the authorization cooperation of the authorization server cooperation client 400 based on an operation of the user. Having received the access to the device browser authorization URL, the authorization server cooperation client 400 treats the device browser authorization URL as a URL that does not require a web login. That is, conventionally, to use the authorization server cooperation client 400 as described above, it is necessary to log into the web login application 1100. The execution of the process of step S2.3, however, eliminates the need for the user to, after logging into the local login application 1000 once, log in again to use the authorization server cooperation client 400. This improves the operability. The authorization server cooperation client 400 may respond to the web browser 900, with a screen 1801 as illustrated in FIG. 8A for confirming the start of the authorization cooperation. In step S2.4, having received the start of the authorization cooperation, the authorization server cooperation client 400 identifies the login application. Consequently, the authorization server cooperation client 400 identifies the login application as the local login application 1000. The identifying of the login application will be described in detail later. Next, in step S2.5, the authorization server cooperation client 400 determines whether it is necessary to update the device information.

If it is necessary to update the device information, the authorization server cooperation client 400 makes a device information update request to the authorization server 200. The determination of whether it is necessary to update the device information will be described in detail later.

In step S2.6, the authorization server cooperation client 400 requests the login context generated in step S2.2 from the local login application 1000 identified in step S2.4.

In step S2.7, having received the request for the login context, the local login application 1000 transmits, in response to the request, the login context to the authorization server cooperation client 400 having made the request.

In step S2.8, the authorization server cooperation client 400 requests a redirection from the web browser 900 to make an OAuth authorization request to the URL described in the end point URL 1603 of the device management table 1600. The authorization request includes information of the client ID 1601 and the redirection URL 1607 of the device management table 1600. The redirection URL 1607 included in the authorization request is a device browser redirection URL and is a URL that matches the FQDN of the request received in step S2.3. Further, the authorization request may include a scope indicating the limit of authority to be authorized by OAuth. In the present exemplary embodiment, the description is given on the assumption that a scope A has been requested as the scope.

Figure 8B:
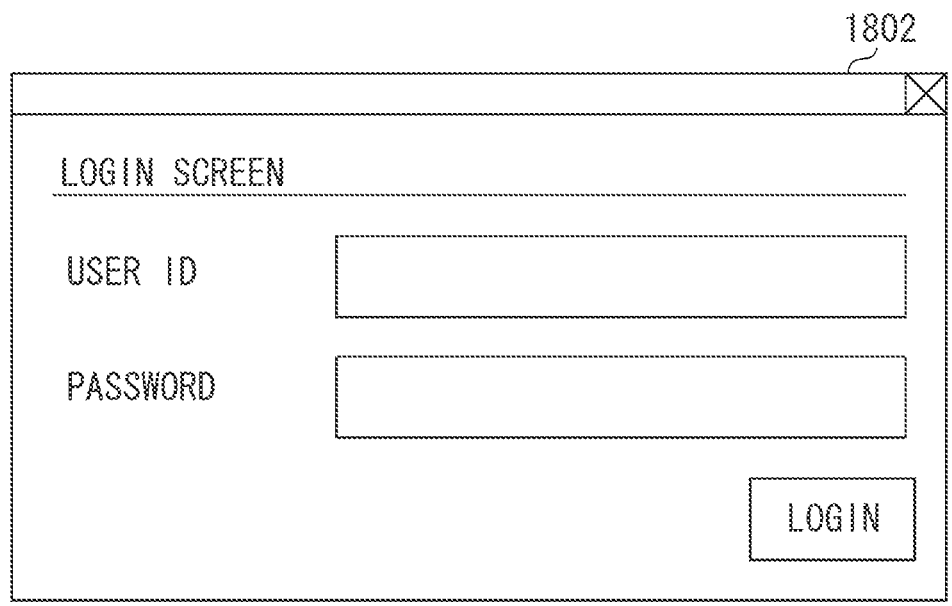
FIG. 8B is a diagram illustrating an example of a login screen.
Figure 8C:
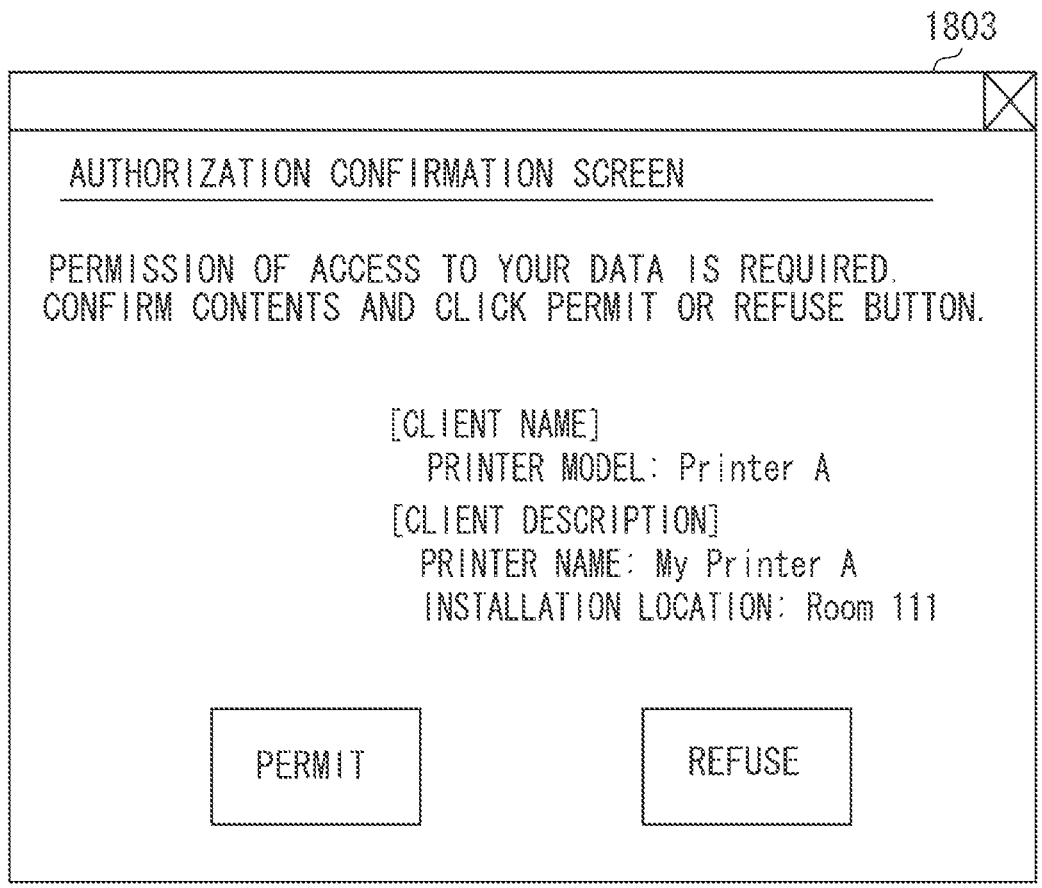
FIG. 8C is a diagram illustrating an example of an authorization confirmation screen.

In step S2.9, having received the authorization request from the web browser 900, the authorization server 200 responds to the web browser 900, with a login screen 1802 as illustrated in FIG. 8B to authenticate the user. In step S2.10, the user logs in by inputting a user ID and a password to the login screen 1802 displayed in the web browser 900. The authorization server 200 verifies whether the set of the user ID and the password that have been received matches information registered in the user management table 1300. If the set matches the information, the authorization server 200 generates authentication information linked with the user ID, and executes the next process. The authorization server 200 verifies whether the set of the client ID 1601 and the redirection URL 1607 included in the authorization request matches information registered in the client management table 1400. If the result of the verification has been positive, in step S2.11, the authorization server 200 acquires the client name 1402 and the client description 1403 of the client management table 1400, generates an authorization confirmation screen 1803 as illustrated in FIG. 8C, and responds to the web browser 900 with the authorization confirmation screen 1803. At this time, the authorization server 200 stores the authentication information as cookie information in the web browser 900 and responds to the web browser 900. In the present exemplary embodiment, the client name 1402 and the client description 1403 are described such that it is displayed on the authorization confirmation screen 1803. Alternatively, information of the user having logged in may be displayed on the authorization confirmation screen 1803. If the authorization request includes a scope, information describing the range of the scope may be displayed on the authorization confirmation screen 1803.

Next, in step S2.12, the user gives permission on the authorization confirmation screen 1803 displayed on the web browser 900.

Having received the permission via the web browser 900, the authorization server 200 issues an authorization code to the authorization token management table 1500 and registers the authorization code in the authorization token management table 1500. At this time, the authorization server 200 registers the ID of the issued token in the authorization token ID 1501, registers the authorization code in the token type 1502, registers the expiration date in the expiration date 1503, and registers in the client ID 1507 the client ID 1601 received when the authorization request has been made. Further, the authorization server 200 registers in the user ID 1508 the user ID linked with the authentication information transmitted as cookie information from the web browser 900. Then, in step S2.13, the authorization server 200 makes a redirection request as an authorization response to the web browser 900 to the redirection URL to which the authorization token ID of the authorization code has been given.

In step S2.14, having received the authorization response via the web browser 900, the authorization server cooperation client 400 makes a token request to the authorization server 200. The token request includes the authorization token ID of the authorization code acquired in the authorization response, and the client ID 1601, the client secret 1602, and the redirection URL 1607 of the device management table 1600.

In step S2.15, having received the token request, the authorization server 200 performs the following verification, and if all the verification results have been positive, generates a parent token. The authorization server 200 verifies whether the set of the client ID 1601 and the client secret 1602 received in the token request matches the set of the user ID 1301 and the password 1302 registered in the user management table 1300. Next, the authorization server 200 verifies whether the authorization token ID of the authorization code received in the token request is registered in the authorization token management table 1500 and has not expired. Then, the authorization server 200 verifies whether the client ID 1601 and the redirection URL 1602 received in the token request match the client ID 1507 identified by the authorization token ID 1501 of the authorization token management table 1500 and the redirection URL 1404 of the client management table 1400, respectively. At this time, the authorization server 200 may not register the redirection URL 1404 in the client management table 1400, but may add a column to the authorization token management table 1500, thereby registering the redirection URL 1404 when the authorization server 200 issues the authorization code. Then, the authorization server 200 may verify whether the redirection URL 1602 received in the token request matches the redirection URL registered in this added column.

If all the verification results have been positive, the authorization server 200 generates a parent token. Then, in step S2.16, the authorization server 200 responds to the authorization server cooperation client 400 with the authorization token ID of the parent token. At this time, the authorization server 200 transmits the response by including in the content of the response also a refresh token ID issued simultaneously. Regarding the parent token, the authorization server 200 registers the ID of the issued token in the authorization token ID 1501, registers the parent token in the token type 1502, and registers the expiration date in the expiration date 1503. Further, the authorization server 200 registers the client ID 1507 and the user ID 1508 as information to be taken over from the authorization code. Further, the authorization server 200 issues a refresh token for refreshing the parent token, registers the refresh token ID in the refresh token ID 1505, and registers the refresh expiration date in the refresh expiration date 1506. Processing regarding refreshing will be described later.

In step S2.17, having acquired the authorization token ID of the parent token and the refresh token ID, the authorization server cooperation client 400 acquires a device user ID from the login context acquired from the local login application 1000 in steps S2.6 and S2.7. Then, the authorization server cooperation client 400 stores the device user ID, the authorization token ID of the parent token, and the refresh token ID in the parent token management table 1700.

Then, in step S2.18, the authorization server cooperation client 400 responds to the web browser 900 with a screen indicating that the authorization cooperation has completed, and the authorization server cooperation client 400 ends the processing.

Next, with reference to FIG. 7B, the process of acquiring a parent token using the web browser 1200 of the client terminal 220 is described.

First, in step S3.1, the user logs into the image forming apparatus 300 through the web browser 1200 by a login method using an input screen provided by the web login application 1100. If the user having logged in has the user ID "user 001", in step S3.2, the local login application 1000 generates a login context including "user 001".

Next, in step S3.3, the web browser 1200 accesses a client terminal browser authorization URL to start the authorization cooperation of the authorization server cooperation client 400 based on an operation of the user. At this time, the authorization server cooperation client 400 may respond with the screen 1801 as illustrated in FIG. 8A for confirming the start of the authorization cooperation.

In step S3.4, having received the start of the authorization cooperation, the authorization server cooperation client 400 identifies the login application. Consequently, the authorization server cooperation client 400 identifies the login application as the web login application 1100. The identifying of the login application will be described in detail later.

Next, in step S3.5, the authorization server cooperation client 400 determines whether it is necessary to update the device information. If it is necessary to update the device information, the authorization server cooperation client 400 makes a device information update request to the authorization server 200. The determination of whether it is necessary to update the device information will be described in detail later.

In step S3.6, the authorization server cooperation client 400 requests the login context generated in step S3.2 from the web login application 1100 identified in step S3.4.

In step S3.7, having received the request for the login context, the web login application 1100 transmits, in response to the request, the login context to the authorization server cooperation client 400 having made the request.

In step S3.8, the authorization server cooperation client 400 makes a redirection request to the web browser 1200 to request an OAuth authorization from the URL described in the end point URL 1603 of the device management table 1600. The authorization request includes information of the client ID 1601 and the redirection URL 1607 of the device management table 1600. The redirection URL 1607 included in the authorization request is a client terminal redirection URL and is a URL that matches the FQDN of the request received in step S3.3.

Steps S3.9 to S3.16 are different from steps S2.9 to S2.16 described above only in that the web browser 900 of the image forming apparatus 300 is replaced by the web browser 1200 of the client terminal 220, and therefore are omitted for ease of description.

In step S3.17, having acquired the authorization token ID of the parent token and the refresh token ID, the authorization server cooperation client 400 acquires a device user ID from the login context acquired from the web login application 1100 in steps S3.6 and S3.7. Then, the authorization server cooperation client 400 stores the device user ID, the authorization token ID of the parent token, and the refresh token ID in the parent token management table 1700.

Then, in step S3.18, the authorization server cooperation client 400 responds to the web browser 1200 with a screen indicating that the authorization cooperation has completed, and the authorization server cooperation client 400 ends the processing.

Figure 9A:
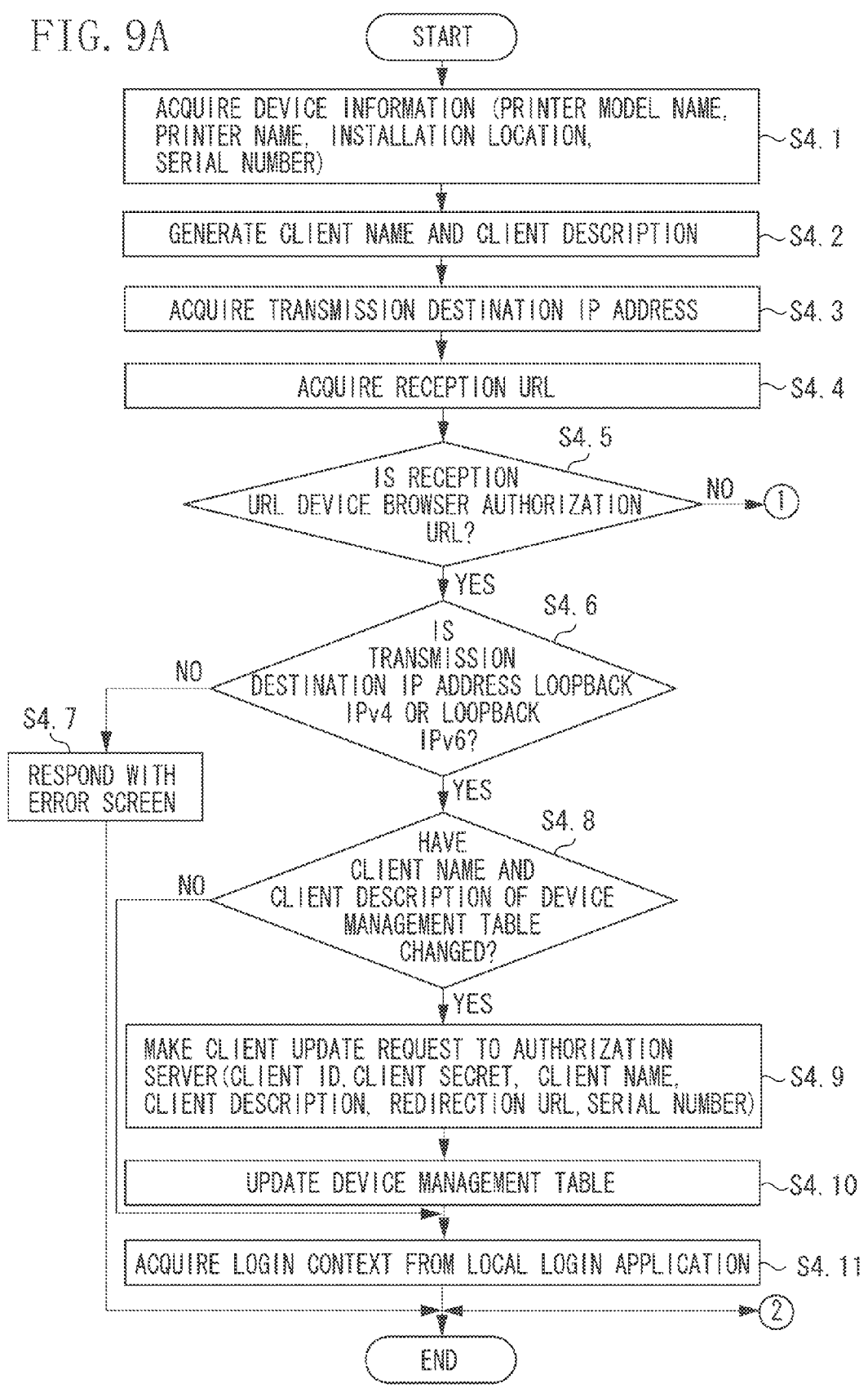
FIG. 9A-9B is a flow chart illustrating examples of the process of identifying a login application and the process of determining whether it is necessary to update device information.
Figure 9B:
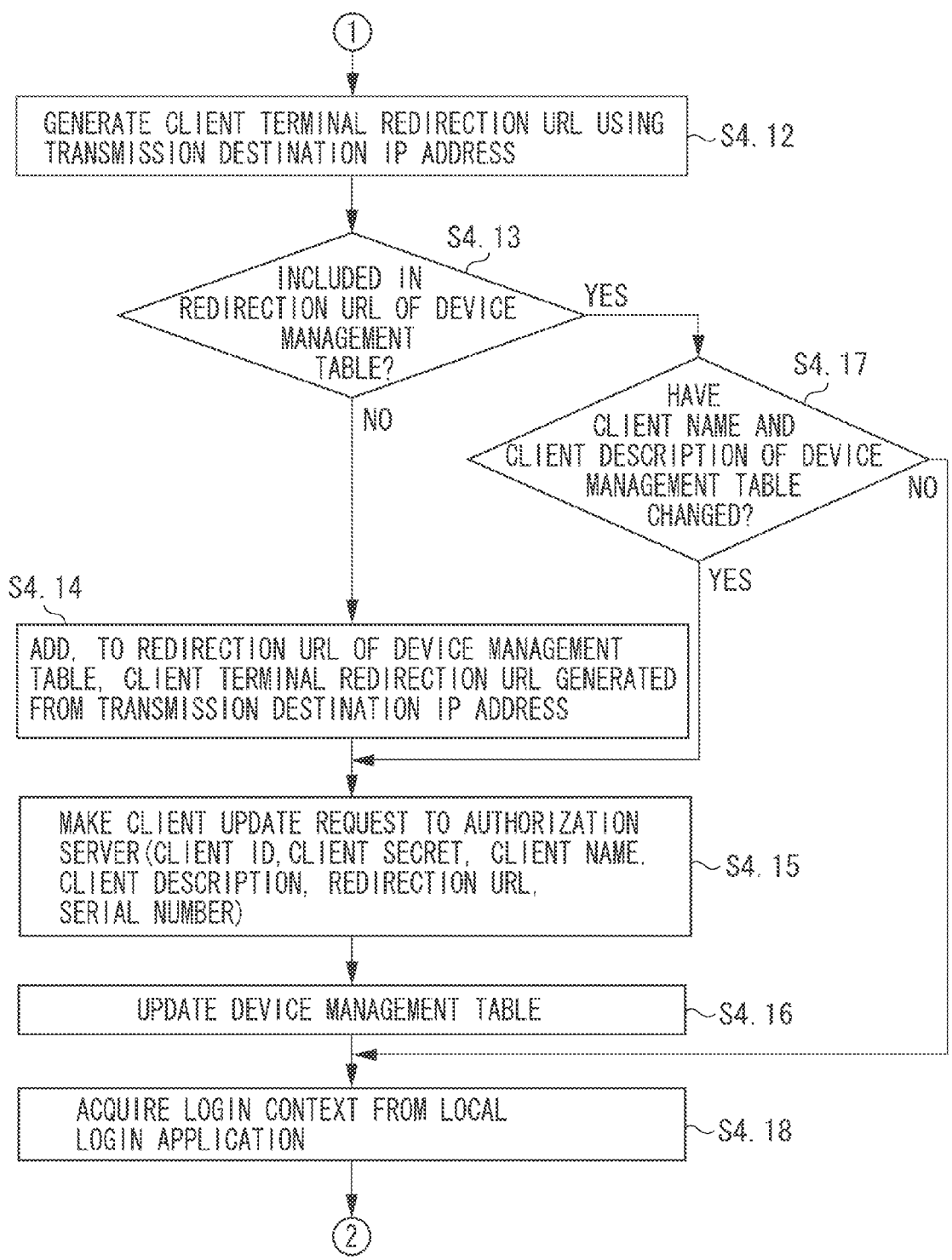

FIG. 9A-9B is a flow chart illustrating examples of the process of identifying the login application and the process of determining whether it is necessary to update the device information, the processes performed by the authorization server cooperation client 400 after the authorization server cooperation client 400 has received an authorization cooperation start request. The processing illustrated in FIG. 9A-9B is detailed processes of steps S2.4 to S2.7 in FIG. 7A and steps S3.4 to S3.7 in FIG. 7B.

In step S4.1, having received an authorization cooperation start request, the authorization server cooperation client 400 first acquires the device information of the image forming apparatus 300. In step S4.2, the authorization server cooperation client 400 generates a client name and a client description. The acquisition of the device information in step S4.1 and the generation of a client name and a client description in step S4.2 are similar to the processes of steps S1.2 and S1.3 in FIG. 6, and therefore are not described here.

Next, in step S4.3, the authorization server cooperation client 400 acquires a transmission destination Internet Protocol (IP) address of the authorization cooperation start request. The transmission destination IP address is the FQDN of a destination URL designated by the web browser 900 or 1200. In the present exemplary embodiment, there is a possibility that a loopback address or an IP address of the image forming apparatus 300 is designated as the transmission destination IP address.

In step S4.4, the authorization server cooperation client 400 also acquires a reception URL of the authorization cooperation start request. The reception URL for the start of the authorization of the authorization server cooperation client 400 includes two types of URLs, namely the device browser authorization URL and the client terminal browser authorization URL. The authorization server cooperation client 400 acquires the URL designated by the web browser 900 or 1200.

In step S4.5, the authorization server cooperation client 400 determines whether the reception URL acquired in step S4.4 is the device browser authorization URL. If the reception URL acquired in step S4.4 is the device browser authorization URL, the authorization server cooperation client 400 proceeds to step S4.6. If the reception URL acquired in step S4.4 is not the device browser authorization URL, the authorization server cooperation client 400 proceeds to step S4.12. In step S4.6, the authorization server cooperation client 400 determines whether the transmission destination IP address acquired in step S4.3 is a loopback IPv4 address or a loopback IPv6 address. If the transmission destination IP address acquired in step S4.3 is a loopback IPv4 address or a loopback IPv6 address, the authorization server cooperation client 400 proceeds to step S4.8. If, on the other hand, the transmission destination IP address acquired in step S4.3 is neither a loopback IPv4 address nor a loopback IPv6 address, the authorization server cooperation client 400 proceeds to step S4.7.

The transmission destination IP address is an example of a transmission destination address. The loopback IPv4 address and the loopback IPv6 address are examples of an internal communication address. In step S4.7, the authorization server cooperation client 400 responds to the web browser 900 with an error screen.

On the other hand, in steps S4.8 and S4.9, the authorization server cooperation client 400 determines the presence or absence of a change in the client information.

In step S4.8, the authorization server cooperation client 400 compares the client name 1605 and the client description 1606 of the device management table 1600 held in the authorization server cooperation client 400, with the client name and the client description generated in step S4.2. Then, the authorization server cooperation client 400 determines whether the client information has changed in step S4.8. If the client information has changed, the authorization server cooperation client 400 proceeds to step S4.9. If the client information has not changed, the authorization server cooperation client 400 proceeds to step S4.11.

In step S4.9, the authorization server cooperation client 400 makes a client update request to the authorization server 200. The client update request is made to the end point URL 1603. The client update request includes the client ID 1601, the client secret 1602, the client name and the client description generated in step S4.2, the redirection URL 1607, and the serial number acquired in step S4.1.

In step S4.10, the authorization server cooperation client 400 updates the device management table 1600 using the client name and the client description generated in step S4.2.

In step S4.11, the authorization server cooperation client 400 acquires the login context from the local login application 1000. The process of step S4.11 corresponds to the processes of steps S2.6 and S2.7 in FIG. 7A.

On the other hand, in step S4.12, the authorization server cooperation client 400 generates a client terminal redirection URL as the FQDN of the transmission destination IP address acquired in step S4.3.

Then, in step S4.13, the authorization server cooperation client 400 confirms whether the client terminal redirection URL generated in step S4.12 is included in the redirection URL 1607. If the client terminal redirection URL generated in step S4.12 is included in the redirection URL 1607, the authorization server cooperation client 400 proceeds to step S4.17. If the client terminal redirection URL generated in step S4.12 is not included in the redirection URL 1607, the authorization server cooperation client 400 proceeds to step S4.14. In step S4.14, the authorization server cooperation client 400 adds the client terminal redirection URL generated in step S4.12 to the redirection URL 1607.

On the other hand, in step S4.17, the authorization server cooperation client 400 compares the client name 1605 and the client description 1606 of the device management table 1600 with the client name and the client description generated in step S4.2, thereby confirming whether the client name 1605 and the client description 1606 have been updated (or changed). If it is determined that the client name 1605 and the client description 1606 have been updated, the authorization server cooperation client 400 proceeds to step S4.15. If it is determined that the client name 1605 and the client description 1606 have not been updated, the authorization server cooperation client 400 proceeds to step S4.18.

In step S4.15, the authorization server cooperation client 400 makes a client update request to the authorization server 200. The client update request is made to the end point URL 1603. If the processing has transitioned from step S4.14 to step S4.15, the client update request includes the client ID 1601, the client secret 1602, the client name and the client description generated in step S4.2, the redirection URL generated in step S4.14, and the serial number acquired in step S4.1. If, on the other hand, the processing has transitioned from step S4.17 to step S4.15, the client update request includes the client ID 1601, the client secret 1602, the client name and the client description generated in step S4.2, the redirection URL generated in step S4.12, and the serial number acquired in step S4.1. If the processing has transitioned from step S4.17 to step S4.15, the redirection URL generated in step S4.12 is the redirection URL included in the redirection URL 1607 of the device management table 1600, and therefore may not be included in the client update request.

Next, in step S4.16, the authorization server cooperation client 400 performs the process of updating the device management table 1600. If the processing has transitioned to step S4.16 via steps S4.14 and S4.15, the authorization server cooperation client 400 updates the device management table 1600 using the client name and the client description generated in step S4.2 and the redirection URL generated in step S4.14. If, on the other hand, the processing has transitioned to step S4.16 via steps S4.17 and S4.15, the authorization server cooperation client 400 updates the device management table 1600 using the client name and the client description generated in step S4.2 and the redirection URL generated in step S4.12. As described above, if the processing has transitioned to step S4.16 via steps S4.17 and S4.15, the authorization server cooperation client 400 may update the device management table 1600 using the client name and the client description generated in step S4.2.

Subsequently, in step S4.18, the authorization server cooperation client 400 acquires the login context from the web login application 1100. The process of step S4.18 corresponds to the processes of steps S3.6 and S3.7 in FIG. 7B.

That is, if it is determined, using the result of the process of step S4.5, that the reception URL is a URL for the device browser, the authorization server cooperation client 400 identifies the login application as the local login application 1000. If, on the other hand, it is determined that the reception URL is not a URL for the device browser, the authorization server cooperation client 400 identifies the login application as the web login application 1100.

In the process of updating the client information, the authorization server cooperation client 400 makes a client update request to the authorization server 200 only when the client information has changed. This can reduce the load of the authorization server 200.

The authorization server cooperation client 400 classifies the address information into a fixed address, a variable address, and a dynamic address. In the present exemplary embodiment, a fixed address includes a loopback IPv4 address and a loopback IPv6 address, and is an address that does not change. In the present exemplary embodiment, a variable address includes an IPv4 address, a manual IPv6 address, a stateful IPv6 address, and a host name, and is an address that can be changed by the user. In the present exemplary embodiment, a dynamic address includes a link-local IPv6 address and a stateless IPv6 address, and is an address that is automatically and dynamically assigned and therefore is likely to be changed at the start of the authorization server cooperation client 400.

The authorization server cooperation client 400 uses a variable address as the client terminal redirection URL for registering the client information at the start of the authorization server cooperation client 400, and uses a fixed address as the device browser redirection URL. Then, the authorization server cooperation client 400 updates the client information only when the variable address has been changed (that is, when the transmission destination IP address acquired in step S4.4 is not included in the redirection URL of the device management table 1600). As a result, it is possible to reduce the frequency of update of the client information, and therefore reduce the load of the authorization server 200.

Next, a dynamic address is highly likely to be changed. Thus, if the authorization server cooperation client 400 changes the client information in the authorization server 200 every time a dynamic address is changed, the load of the authorization server 200 increases. For example, if an operation is performed such that image forming apparatuses 300 in a company are started in the morning at the start of a workday, all the image forming apparatuses 300 simultaneously request the authorization server 200 to change the client information. This leads to a concentration of the load of the authorization server 200. In contrast, if, only when a dynamic address is used for an authorization cooperation start request, the authorization server cooperation client 400 generates a redirection URL from the dynamic address and changes the client information, it is possible to prevent frequent changes in the client information. The authorization server cooperation client 400 may change in the client information also a redirection URL generated from a fixed address or a variable address, every time an authorization cooperation start request is made. However, since a fixed address and a variable address are frequently used, this increases also the frequency of change in the client information. In contrast, a dynamic address is used less frequently than a fixed address and a variable address. Thus, the authorization server cooperation client 400 may not initially register the information at the start of the authorization server cooperation client 400, but may register only if needed. Thus, it is possible to reduce the number of requests to change the client information, and therefore suppress the load of the authorization server 200. That is, the authorization server cooperation client 400 changes the timing of registering a redirection URL in the authorization server 200 depending on the type of the redirection URL, and thereby can suppress the load of the authorization server 200.

Subsequently, with reference to FIG. 10, a sequence according to the present exemplary embodiment regarding the acquisition of a child token after the issuance of a parent token is described.

This sequence is performed when the user executes the resource service cooperation applications 500 of the image forming apparatus 300. Either one of the above sequences of acquiring a parent token needs to have been carried out before the processing in FIG. 10 is executed.

First, in step S5.1, the user logs into the image forming apparatus 300 by a login method using an input screen of the image forming apparatus 300 provided by the local login application 1000. If the user having logged in has the user ID "user 001", in step S5.2, the local login application 1000 generates a login context including "user 001", and stores the login context in the RAM 308 so that each application can acquire the login context via the application management framework 800. If the processing is executed successively after the above sequence of acquiring a parent token, it is not necessary to log in again, and the sequence starts from the next step S5.3.

Next, in step S5.3, the user accesses an application screen of the resource service cooperation application 500 by operating the image forming apparatus 300. The application screen is, for example, a screen that allows the selection of a document to be printed if the resource service cooperation application 500 is a print application, or a screen that allows the selection of a form to be generated if the resource service cooperation application 500 is a form application. In a state where the application screen is accessed, for example, all applications in activated states in the application management framework 800 are displayed for selection on an operation panel of the image forming apparatus 300, and the user can select a corresponding application from among all the applications.

In step S5.4, the resource service cooperation application 500 in which the corresponding application screen has been accessed acquires the login context from the local login application 1000.

Then, in step S5.5, the resource service cooperation application 500 makes a token acquisition request to a token acquisition interface of the authorization server cooperation client 400 registered in the application management framework 800. At this time, the resource service cooperation application 500 includes the acquired login context in the token acquisition request. The resource service cooperation application 500 can be configured to request a scope required for the token. In the present exemplary embodiment, the description is given on the assumption that the scope A has been requested successively.

Next, the authorization server cooperation client 400 acquires the refresh token ID from the parent token management table 1700 using as a key the device user ID linked with the acquired login context. At this time, if a user ID is not registered in the parent token management table 1700, the authorization server cooperation client 400 may display a screen that prompts the user to carry out the parent token acquisition sequence. Alternatively, the image forming apparatus 300 may start the web browser 900 and automatically start the parent token acquisition sequence.

The parent token management table 1700 is an example of token management data. The user ID is an example of user information.

In step S5.6, the authorization server cooperation client 400 makes a token refresh request to the authorization server 200 using the acquired refresh token ID, and the client ID 1601 and the client secret 1602 of the device management table 1600. In this case, the description is given on the assumption that time has elapsed between the execution of the parent token acquisition sequence and the child token acquisition sequence, and a valid period of the parent token has expired. If, however, the parent token has not expired, a child token acquisition request in step S5.10 may be carried out without carrying out a token refresh request.

In step S5.7, having received the token refresh request, the authorization server 200 executes the following processing. First, the authorization server 200 verifies whether the set of the client ID 1601 and the client secret 1602 included in the token refresh request matches the set of the user ID 1301 and the password 1302 of the user management table 1300. If the verification has been positive, the authorization server 200 confirms whether the refresh token ID included in the token refresh request is registered in the authorization token management table 1500 and has not expired. Further, the authorization server 200 verifies whether the client ID 1601 included in the token refresh request matches the client ID 1507. If all the verification results have been positive, the authorization server 200 refreshes the parent token.

In step S5.8, the authorization server 200 responds to the authorization server cooperation client 400 with the authorization token ID of the refreshed parent token and the refresh token ID. As the refreshing method, the authorization server 200 newly issues an authorization token ID and a refresh token ID and registers the authorization token ID and the refresh token ID in the authorization token management table 1500. At this time, the authorization server 200 takes over the token type 1502, the scope 1504, the client ID 1507, and the user ID 1508 of a record identified by the refresh token ID received in the token refresh request. Further, after the taking over, the authorization server 200 invalidates the original refresh token ID, specifically, by forcibly causing the original refresh token ID to expire so that the parent token cannot be refreshed again. Alternatively, the authorization server 200 may take over the refresh token ID without newly issuing a refresh token ID.

In step S5.9, having acquired the refreshed parent token, the authorization server cooperation client 400 overwrites information of the parent token management table 1700 using the authorization token ID and the refresh token ID that have been received, and registers the authorization token ID and the refresh token ID again.

In step S5.10, the authorization server cooperation client 400 makes a child token acquisition request to the authorization server 200 using the authorization token ID of the parent token, the client ID 1601 and the client secret 1602 of the device management table 1600, and the scope received in the token acquisition request. In step S5.11, having received the child token acquisition request, the authorization server 200 executes the following processing. First, the authorization server 200 verifies whether the set of the client ID 1601 and the client secret 1602 included in the child token acquisition request matches the set of the user ID 1301 and the password 1302 of the user management table 1300. If the verification has been positive, the authorization server 200 confirms whether the authorization token ID included in the child token acquisition request is registered in the authorization token management table 1500 and has not expired.

Further, the authorization server 200 verifies whether the client ID 1601 included in the child token acquisition request matches the client ID 1507. If all the verification results have been positive, the authorization server 200 generates a child token.

Then, in step S5.12, the authorization server 200 responds to the authorization server cooperation client 400 with the child token. At this time, the authorization server 200 newly issues an authorization token ID to the child token. Then, in the authorization token management table 1500, the authorization server 200 registers the child token in the token type 1502 and registers the scope included in the child token acquisition request in the scope 1504. At this time, the authorization server 200 takes over the client ID 1507 and the user ID 1508 of a record identified by the authorization token ID received in the child token acquisition request. This results in linking the child token, issued at this time by the authorization server 200, with the user ID for identifying the user and the client ID for identifying the image forming apparatus 300. The authorization server 200 does not issue a refresh token to a child token. This is because a client ID and a client secret are required to make a token refresh request, and therefore, a refresh request cannot be made in each application that uses a child token. This is also to eliminate a security risk where each application leaks a refresh token, thereby allowing the expiration date of a token to be freely updated.

Then, having acquired the authorization token ID of the child token, the authorization server cooperation client 400 responds to the resource service cooperation application 500 having made the request, with the authorization token ID of the child token.

In step S5.13, having acquired the authorization token ID of the child token, the resource service cooperation application 500 makes a resource request including the authorization token ID to the resource server 210.

In step S5.14, having received the resource request, the resource server 210 makes a token verification request to the authorization server 200 to verify the authorization token ID of the child token included in the resource request. The resource server 210 can include a scope in the token verification request. In step S5.15, having received the token verification request, the authorization server 200 verifies whether the received authorization token ID is registered in the authorization token management table 1500, whether the received authorization token ID is unexpired, and whether the received scope is within the range of the scope 1504.

Then, in step S5.16, the authorization server 200 responds to the resource server 210 with the verification results.

Next, in step S5.17, the resource server 210 makes a token information acquisition request to the authorization server 200 to acquire token information of the authorization token ID of the child token.

In step S5.18, having received the token information acquisition request, the authorization server 200 acquires information identified by the authorization token ID received from the authorization token management table 1500, and responds to the resource server 210 with the acquired information. The response includes, for example, information of the scope 1504, the client ID 1507, and the user ID 1508. Further, the authorization server 200 can be configured to include in the response the serial number 1405 registered in the client management table 1400 identified by the client ID 1507.

Having acquired the token information, the resource server 210 determines, based on the acquired information, whether access to the resource having received the request should be permitted or refused. The resource server 210 identifies the image forming apparatus 300 based on the serial number 1405 or the client ID 1507 and permits only the access of the image forming apparatus 300 authorized by the user. Further, similarly, the resource server 210 may determine, based on the scope 1504 or the user ID 1508 that can be acquired from the token information, whether access to the resource should be permitted or refused.

If, as a result, it is determined that access to the resource should be permitted, in step S5.19, the resource server 210 responds to the resource service cooperation application 500 with the resource. The resource is, for example, a list of documents that can be printed if the resource server 210 provides a print service, or a list of forms that can be generated if the resource server 210 provides a form service.

The authorization server 200 and the resource server 210 are described above such that each of the servers verifies the token in steps S5.14 to S5.18. However, the authorization server 200 may manage an application capable of accessing a resource, and the authorization server 200 may perform all the verification.

In step S5.20, having received the response with the resource, the resource service cooperation application 500 creates the above application screen based on the received data and responds to the user with the application screen.

In the present exemplary embodiment, the image forming apparatus 300 provides a device browser authorization URL and a client terminal authorization URL. The device browser authorization URL can be accessed without a web login, but the access is limited only to internal communication. In the case of access through the device browser authorization URL, the image forming apparatus 300 links an authorization token with a local login user. In the case of access through the client terminal authorization URL, the image forming apparatus 300 links an authorization token with a web login user. Even if a device browser is used, it is possible to give authorization based on only one local login, and further, a device browser authorization URL without a web login can be accessed only by internal communication, so that security is retained.

OTHER EMBODIMENTS

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above exemplary embodiment, it is possible to enable an easy login and also enable the prevention of unauthorized access.

While exemplary embodiments have been described, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2012-235971 filed Oct. 25, 2012, which is hereby incorporated by reference herein in its entirety.

What is claimed is:

1. An image forming apparatus that communicates with an external apparatus, the image forming apparatus comprising:
    a memory; and
    a processor, the processor configured to:
        receive, in the memory, local login information regarding a local login to the image forming apparatus;
        determine, in response to receiving, in the memory, a request including a URL for authorizing a user without using web access authentication, whether an internal communication address is used;
        register, in an authorization server, a first URL for authorizing the user without web access authentication and a second URL for authorizing the user with web access authentication, and
            if a transmission destination address of the request is a variable address and a URL based on the variable address is not registered, register the URL based on the variable address as the second URL in the authorization server, and
            if the transmission destination address of the request is a dynamic address, register a URL based on the dynamic address as the second URL in the authorization server according to acquisition of the dynamic address;
        request an authorization request for the external apparatus, if it is determined that the internal communication address is used; and
        manage an authorization token acquired in response to the authorization request and the local login information by associating the authorization token with the local login information in the memory.

2. The image forming apparatus according to claim 1, wherein the processor is further configured to display an error screen in response to determining that the internal communication address is not used.

3. The image forming apparatus according to claim 1, wherein the processor changes timing of registering the first URL or the second URL in the authorization server depending on a type of the URL.

4. A control method executed by an image forming apparatus that communicates with an external apparatus, the control method comprising:
    receiving local login information regarding a local login to the image forming apparatus;
    determining, if a request including a URL for authorizing a user without using web access authentication is received, whether an internal communication address is used;
    registering, in an authorization server, a first URL for authorizing the user without web access authentication and a second URL for authorizing the user with web access authentication, and
        if a transmission destination address of the request is a variable address and a URL based on the variable address is not registered, register the URL based on the variable address as the second URL in the authorization server, and
        if the transmission destination address of the request is a dynamic address, register a URL based on the dynamic address as the second URL in the authorization server according to acquisition of the dynamic address
    requesting, an authorization request for the external apparatus, if it is determined that the internal communication address is used; and
    managing an authorization token acquired in response to the authorization request and the local login information by associating the authorization token with the local login information.

5. The control method according to claim 4, further comprising displaying an error screen if the internal communication address is not used, an error screen is displayed.

6. The control method according to claim 4,
wherein, timing of registering the first URL or the second URL in the authorization server is changed depending on a type of the URL.

7. A non-transitory computer-readable storage medium storing computer-executable instructions to be executed by an image forming apparatus that communicates with an external apparatus, the computer-executable instructions comprising:
receiving local login information regarding a local login to the image forming apparatus;
determining, if a request including a URL for authorizing a user without using web access authentication is received, whether an internal communication address is used;
registering, in an authorization server, a first URL for authorizing the user without web access authentication and a second URL for authorizing the user with web access authentication, and
if a transmission destination address of the request is a variable address and a URL based on the variable address is not registered, register the URL based on the variable address as the second URL in the authorization server, and
if the transmission destination address of the request is a dynamic address, register a URL based on the dynamic address as the second URL in the authorization server according to acquisition of the dynamic address
requesting, an authorization request for the external apparatus, if it is determined that the internal communication address is used; and
managing an authorization token acquired in response to the authorization request and the local login information by associating the authorization token with the local login information.

8. The computer-readable storage medium according to claim 7, wherein an error screen is displayed if the internal communication address is not used.

9. The computer-readable storage medium according to claim 7,
wherein, timing of registering the first URL or the second URL in the authorization server is changed depending on a type of the URL.

* * * * *